United States Patent [19]

Haller et al.

[11] 4,193,187

[45] Mar. 18, 1980

[54] CLAMP-SQUEEZING APPARATUS

[75] Inventors: Jacob S. Haller, Northbrook; Gordon L. Mines, Elmhurst; Meinert J. Mischnick, Mount Prospect, all of Ill.

[73] Assignee: TRW, Inc., Elk Groove Village, Ill.

[21] Appl. No.: 890,671

[22] Filed: Mar. 27, 1978

[51] Int. Cl.[2] ........................ B23P 19/00; B23P 11/00

[52] U.S. Cl. ........................................ 29/749; 29/751; 29/758; 29/759

[58] Field of Search ................. 29/749, 753, 754, 714, 29/715, 759, 628, 630 R, 630 A, 751, 758; 72/410, 412, 416; 228/249; 200/61.42

[56] References Cited

U.S. PATENT DOCUMENTS

| | | | |
|---|---|---|---|
| 2,198,966 | 4/1940 | Herman | 29/749 |
| 2,271,077 | 1/1942 | Judisch | 29/749 |
| 2,278,176 | 3/1942 | Herman | 29/749 |
| 2,316,593 | 4/1943 | Judisch | 29/749 |
| 2,727,300 | 12/1955 | Klumpp, Jr. | 29/754 X |
| 3,032,860 | 5/1962 | Andren | 29/628 X |
| 3,484,936 | 12/1969 | Schwalm et al. | 29/628 |
| 3,561,114 | 2/1971 | Thoms et al. | 29/630 A |
| 3,747,187 | 7/1973 | Colwell | 29/749 X |
| 3,762,043 | 10/1973 | Walter | 29/630 A X |
| 3,780,242 | 12/1973 | Bendror | 200/61.42 X |
| 4,014,087 | 3/1977 | Cover et al. | 29/721 |
| 4,034,472 | 7/1977 | Cover et al. | 29/753 X |

*Primary Examiner*—Francis S. Husar
*Assistant Examiner*—C. J. Arbes
*Attorney, Agent, or Firm*—Neuman, Williams, Anderson & Olson

[57] ABSTRACT

A clamp-squeezing apparatus for automatically urging a cable-engaging clamp of an electrical connector into clamping engagement with a cable is provided. The apparatus is particularly adapted for use in conjunction with wire-terminating apparatus. The squeezing apparatus comprises a movable carriage including a slidable plate on which is mounted a connector nest and pivotal squeezing arms having cam followers and squeeze jaws on opposed ends thereof. Upon movement of the carriage and nest into a desired position, the cam followers are urged by cam tracks in which they ride to urge the squeeze jaws together and squeeze the connector cable clamp into engagement with a cable.

13 Claims, 14 Drawing Figures

FIG. 1
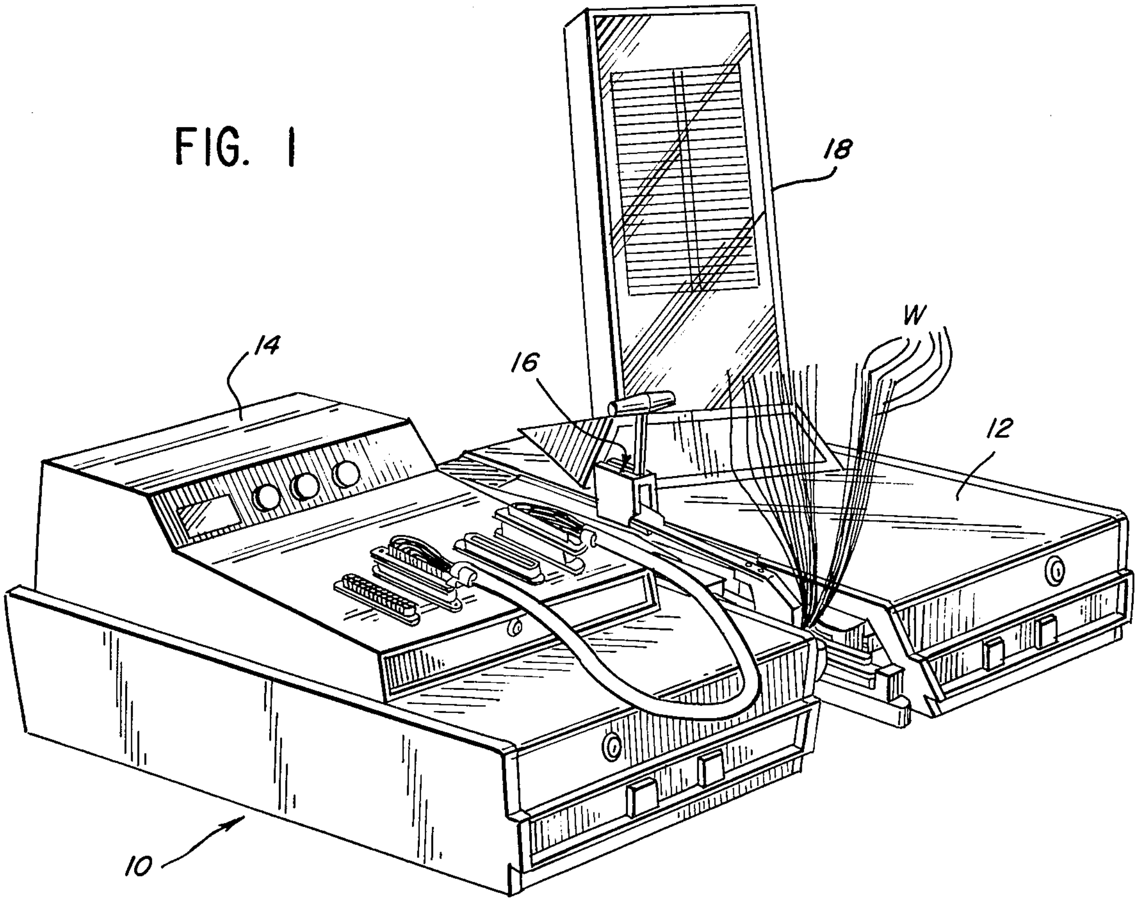
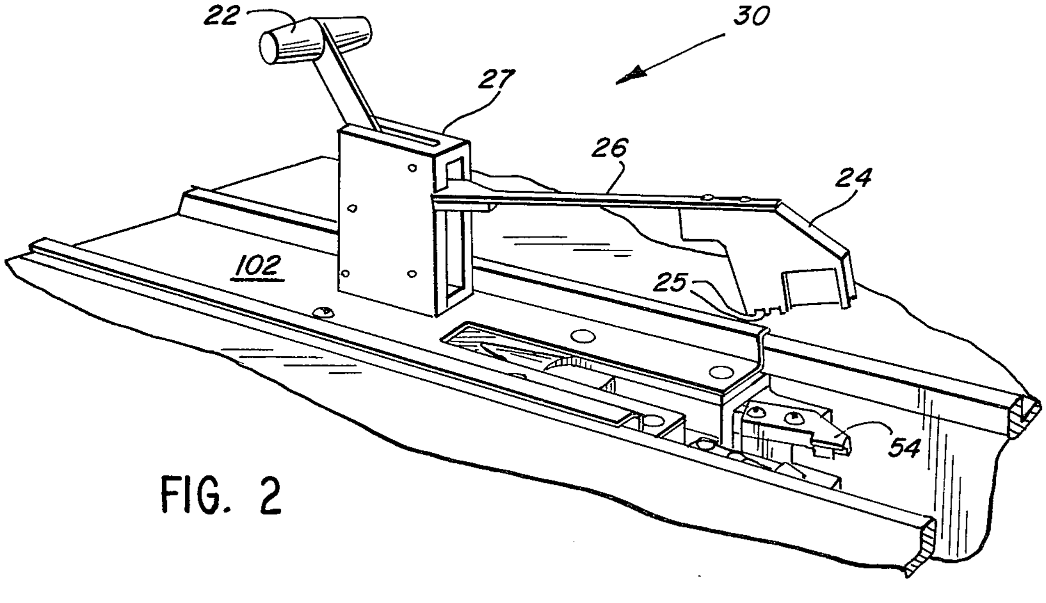
FIG. 2

FIG. 4
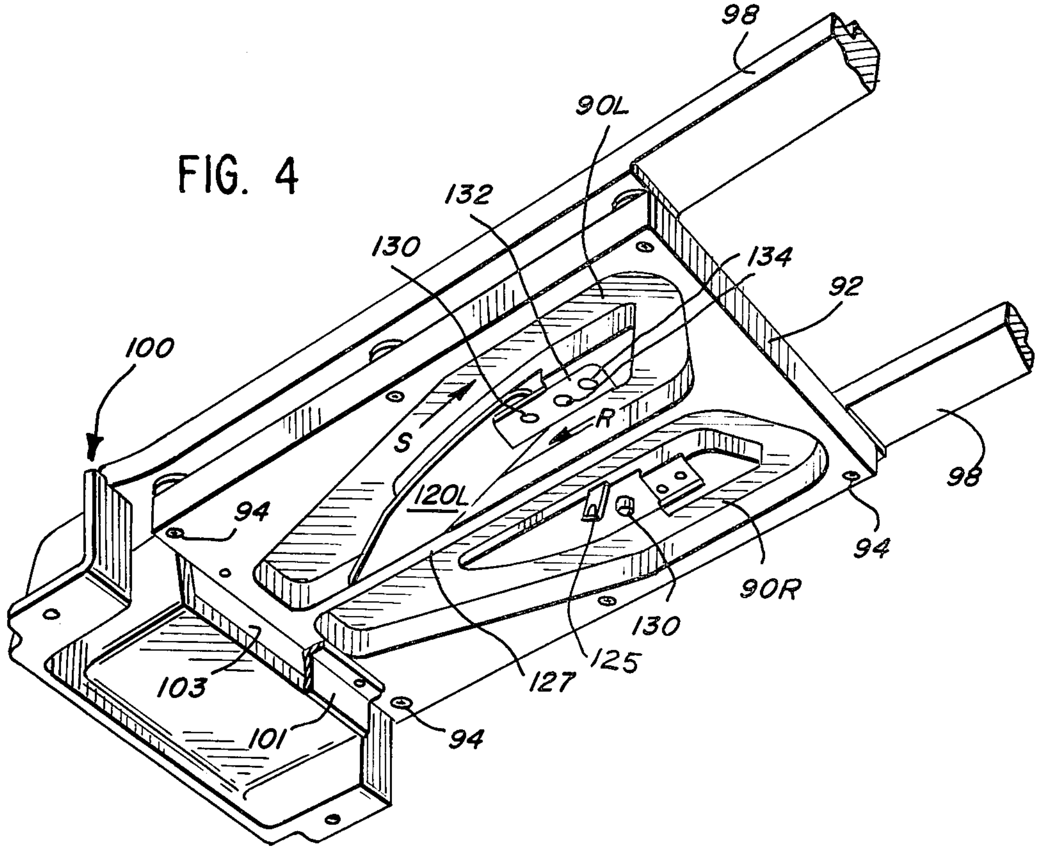
FIG. 5
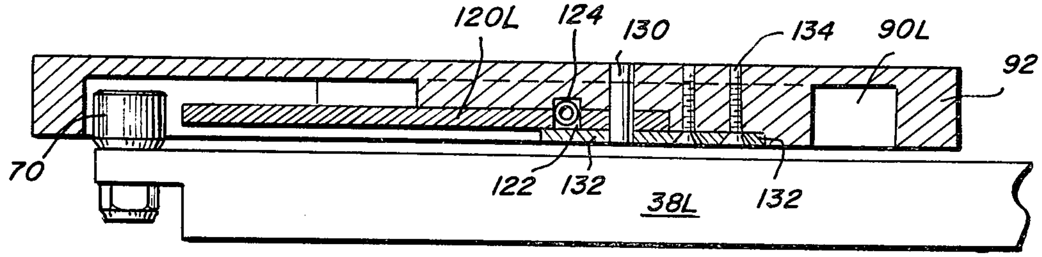
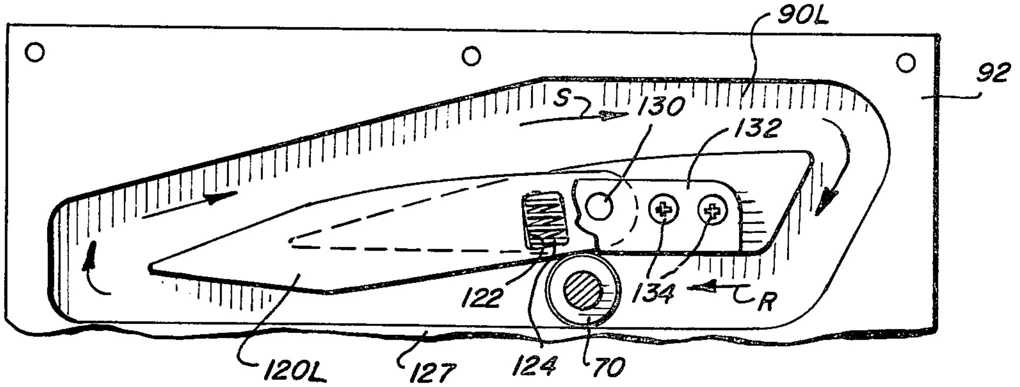
FIG. 6

CLAMP-SQUEEZING APPARATUS

This invention relates to apparatus for automatically squeezing a cable clamp into clamping engagement with a cable having conductors to be terminated in an electrical connector on which the clamp is mounted.

Recent years have seen the development of many a solderless ribbon-type connector in which insulation-covered wires emanating from a cable are terminated in metal contacts mounted in such connector by means of various wire-insertion apparatuses. One apparatus which is used for such terminations on a production basis is disclosed in Cover et al. U.S. Pat. Nos. 4,014,087 and 4,034,472. In this apparatus wires are terminated in a semiautomatic manner in solderless connectors such as those sold by TRW Inc. of Elk Grove Village, Ill. under the name Superibbon. In the apparatus of these patents, the conductors are trimmed to desired length and inserted into the contact jaws of a positioned connector after an operator has prepositioned opposed conductors adjacent receiving channels of such connector. Such semiautomatic apparatuses are flexible in operation, and are adapted to be employed with a variety of connectors having contacts for engaging various numbers of conductors.

A development in connector constructions which is particularly adapted for use with the automatic squeezing apparatus of this invention comprises the connector-cable clamp construction set forth in commonly assigned McKee U.S. patent application Ser. No. 797,587, now U.S. Pat. No. 4,127,315, granted Nov. 28, 1978. The latter discloses a cable clamp mounted on a connector end and adapted to clampingly engage a cable containing conductors to be terminated in such connector by deformation of the clamp. Clamping engagement of the cable will perform a desired strain relief function. Axial forces imparted to such cable are prevented from being transmitted to terminations between metal contacts and the cable conductors within the connector, so as to avoid disruption of the terminations.

In accordance with this invention, squeezing of the cable clamp on such a connector is automatically carried out as a mounted connector is brought into a desired position for conductor termination. The provided apparatus is especially adapted for use with semiautomatic terminating apparatuses of the type above identified.

Thus, it is an object of this invention to provide apparatus for automatically squeezing a cable clamp into clamping engagement with a conductor-containing cable as such connector is slidably moved into a desired position to facilitate connector terminations.

It is another object of this invention to provide an automatic squeezing apparatus which is readily adaptable for incorporation with various terminating apparatus known in the art.

It is yet another object of this invention to provide a squeezing apparatus which eliminates a prior necessary hand operation together with the time and expense necessarily consumed by such operation in which a clamp was separately squeezed into gripping engagement with a cable periphery.

It is another object of this invention to provide a method for automatically effecting at one operator station a step previously carried out manually, and which enables substantially all terminating testing and hood assembly steps to be carried out at a single station in a short time interval heretofore unattainable.

The above and other objects of this invention will become apparent from the following detailed description and accompanying drawings describing one embodiment of an apparatus made in accordance with this invention.

In one embodiment of the provided invention, a movable carriage of a termination machine is slidably mounted on a fixed track for reciprocal movement thereover. The carriage has supportably mounted thereon a connector nest attached thereto whereby a connector may be supportably engaged in fixed position. Pivotally mounted on such plate are opposed squeeze arms. Each arm has a squeezing jaw affixed to one end thereof and a cam follower affixed to the opposed end. The cam followers are guided in tracks formed in a cam plate fixedly mounted adjacent the path of the cam followers movement effected in the course of the carriage movement.

As the carriage proceeds in one direction of axial movement, the squeeze arm jaws are urged toward each other by the camming action of the cam tracks on the cam followers. A cable disposed between opposed sides of a cable clamp affixed to the connector may thus be securely locked in said clamp as the sides are squeezed into interlocking engagement with such cable.

The cable clamp referred to is of the type described in McKee Ser. No. 797,587. This invention has particular applicability when employed with semiautomatic terminating apparatus of the type above mentioned and disclosed in Cover et al U.S. Pat. Nos. 4,014,087 and 4,034,472. The clamp-squeezing action referred to preferably is carried out in the course of locating a connector preparatory to terminating conductors in the contact jaws thereof, thereby increasing the overall efficiency of the terminating operation, as will hereinafter be explained in greater detail.

For a more complete understanding of this invention reference should now be made to the drawings wherein:

FIG. 1 is a perspective view of an assembly comprising wire terminating apparatus and wire connection testing apparatus, with a clamp-squeezing apparatus in accordance with this invention centrally located therein;

FIG. 2 is a fragmentary perspective view of the cable clamp portion of the squeezing apparatus of FIG. 1 illustrated on an enlarged scale prior to receiving a connector therebeneath;

FIG. 4 is a fragmentary perspective view illustrating the cam tracks of a cam plate employed in the clamp-squeezing apparatus of this invention.

FIG. 5 is a longitudinal sectional view of the cam plate illustrated in FIG. 4;

FIG. 6 is a fragmentary plan view partly broken away of one cam track of the cam plate of FIG. 4;

Figure 13:
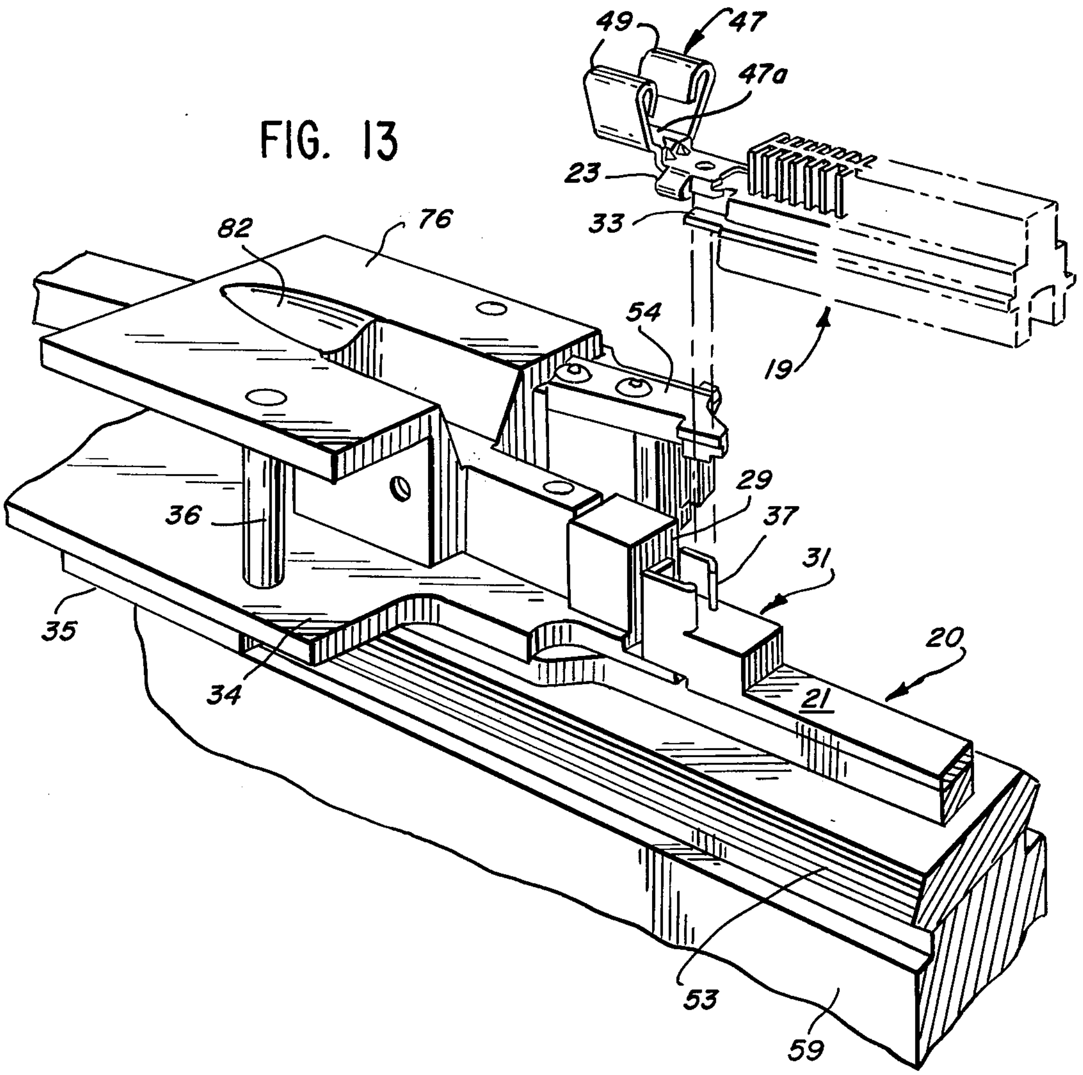
Figure 14:
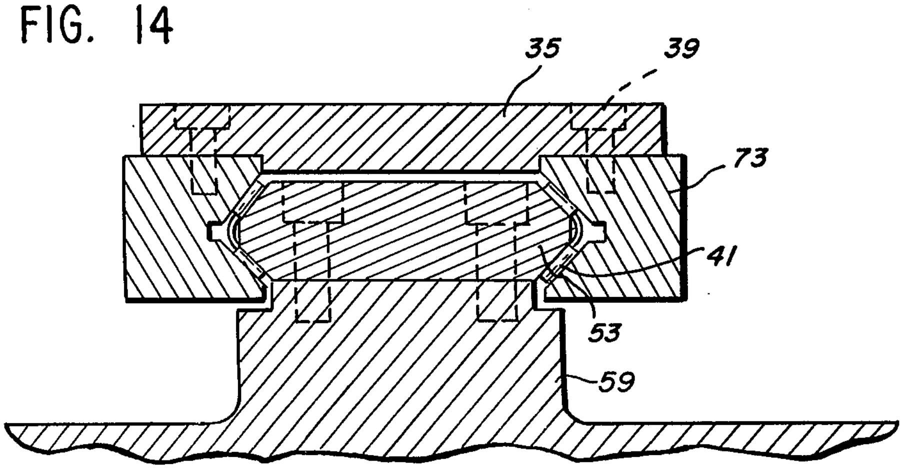

FIG. 13 is a fragmentary perspective view illustrating the connector-receiving nest of the provided apparatus prior to reception of a connector; the illustrated nest and carriage means being slidably mounted on a fixed supporting way for slidable movement thereover; and FIG. 14 is a transverse sectional view illustrating the slidable mounting plate on which the squeezing apparatus of this invention is mounted for reciprocal movement over a supporting way.

Referring now more particularly to FIG. 1, the illustrated machine 10 is adapted to terminate wires in a semiautomatic manner in electrical connectors of varying types, e.g. in connectors sold by TRW Inc., of Elk Grove Village, Ill. under the name Superibbon. The machine 10 includes a housing 12 and is preferably of the type disclosed in the Cover et al U.S. Pat. Nos. 4,014,087 and 4,034,472. Also illustrated in FIG. 1 is a tester 14. The tester is adapted to automatically test the circuitry of a cable assembly comprising the two connectors which have been joined by a cable length and plugged into the apparatus 14 in testing position as illustrated. Should any defect in the terminations in the two connectors be sensed in the course of the test, an identification of the respective conductor will appear on the screen 18. The tester 14 may be of the type manufactured by Vari-Tronics Company of Duarte, Calif., Model CTM9.

Figure 10:
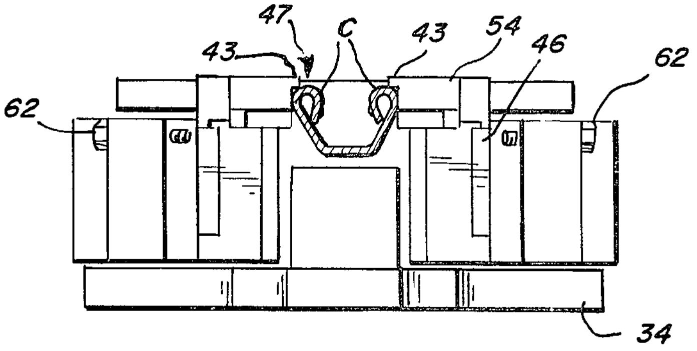
FIG. 10 is an end elevational view of one embodiment of a clamp-squeezing apparatus made in accordance with this invention in its initial connector-receiving position and illustrating a cable clamp prior to squeezing action.
Figure 12:
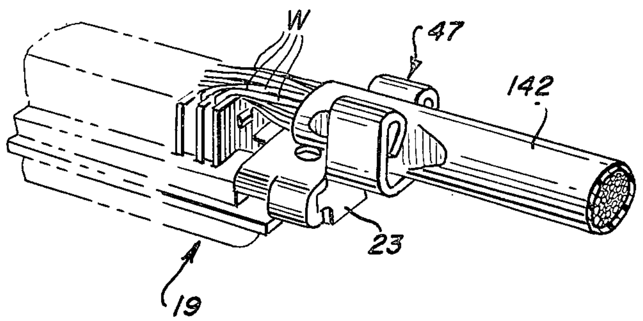
FIG. 12 is a fragmentary perspective view of a connector having a cable clamp mounted thereon clampingly engaging a cable from which conductors emanate, after engagement with the provided apparatus of this invention.

Utilizing the apparatus of FIG. 1 an operator first disposes a connector such as connector 19 of FIG. 12 on support surface 21 of a nest 20 of FIG. 13. (The squeeze arm normally pivotally mounted on pin 36 is not shown in FIG. 13, for clarity of illustration.) End 23 (FIG. 12) of the connector-clamp assembly is butted against edge surface 29 of nest 20. In such position the connector 19 will have side edge shoulders 33 in engagement with the curved ends of locating ears 37. To assist in fixedly positioning connector 19 on the nest 20, a locating recess (not illustrated) may be disposed on the nest in spaced relation with block 31. Such recess snugly receives the connector end oppositely disposed to clamp 47. After positioning the connector-clamp assembly on the nest 20 in the manner described, opposed walls 49 of the cable clamp will be located in desired relation between the open squeeze jaws 54 in the manner illustrated in FIG. 10. A cable is then positioned with an end portion within the clamp 47 and with the protruding wires over the connector; see FIGS. 1 and 12. In FIG. 10 the jaws 54 have been slightly closed from their open condition to initially engage the opposed walls 49.

The handle 22 of a clamp assembly 30 (FIG. 2) is then pulled forward. A pressure pad 24 attached to the end of a clamping arm 26 thereby is urged against the cable within the clamp 47 so as to urge cable 142 against surface surface 47*a* thereof. Handle 22 is pivotally mounted in a housing 27. A toggle mechanism of a well-known type is disposed within housing 27 and joins handle 22 to arm 26. When the handle 22 is pivoted toward the connector into the vertical position of FIG. 1, and the pressure pad 27 engages the cable, clamping arm 26, as well as the attached pressure pad 24, are forced to a fixed, locked, clamping disposition. Thereby the cable and attached connector are securely locked in the machine in a fixed position relative to the nest 20. The lower, cable-engaging surface of pad 24 has serrations 25 (FIG. 2) to effect secure gripping engagement with the cable sheath.

After a connector and attached cable are locked in place, the entire clamp assembly 30 is pulled forward by the operator until the connector 19 and the wires W intended to be terminated therein are disposed adjacent the front edge of the housing 12 as illustrated in FIG. 1. This is the advancing movement of the connector carriage, normally performed preparatory to terminating wires in a connector with a machine 10. In the course of so moving the connector and cable forward, a clamp-squeezing action is simultaneously effected by the apparatus of this invention for closing the clamp 47, as described further below. The wires 34 are then terminated within the connector 19 mounted on the nest 20 in accordance with the procedures set forth in the aforementioned U.S. Pat. Nos. 4,014,087 and 4,034,472.

Figure 3:
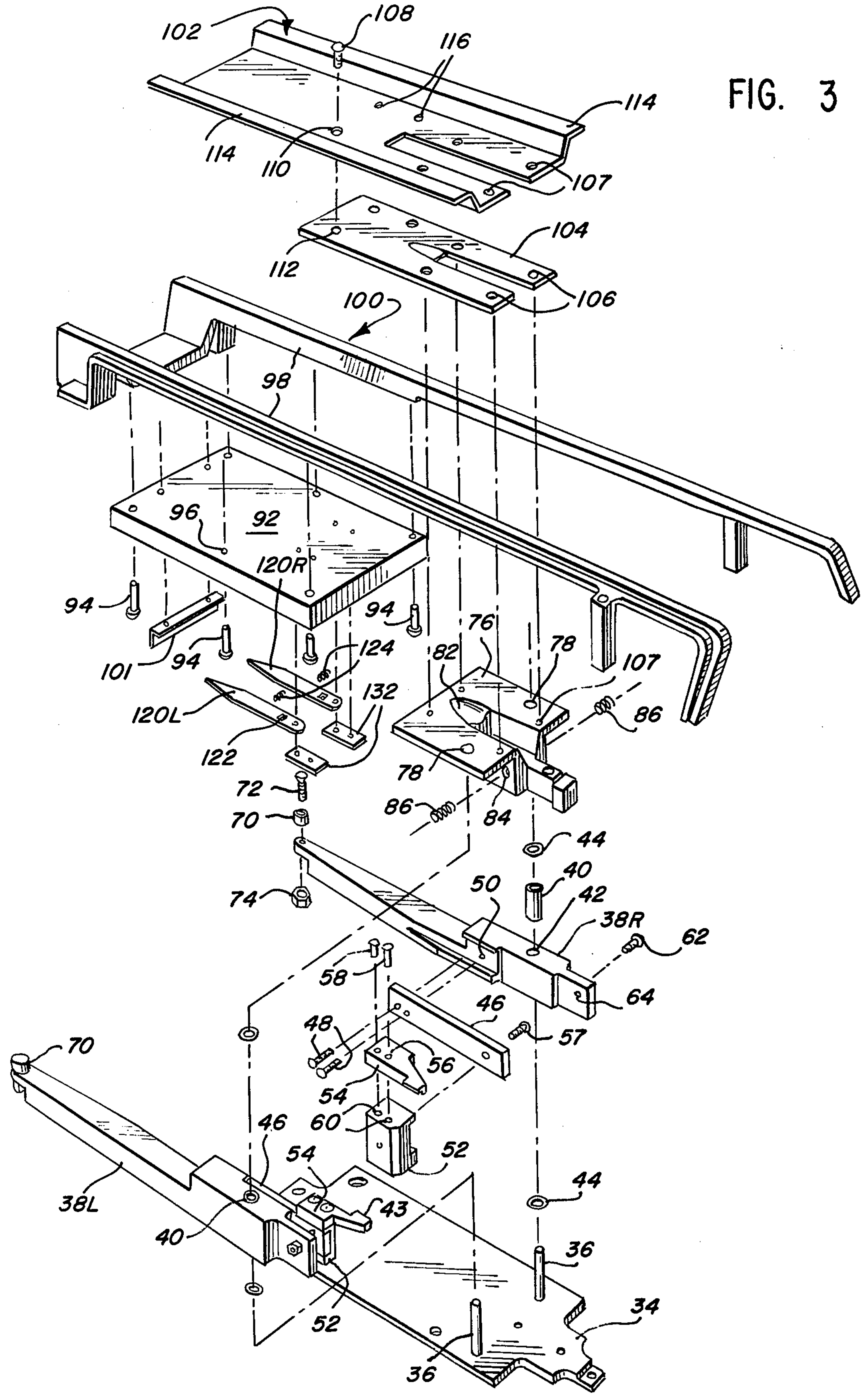
FIG. 3 is an exploded view of the elements incorporated in one embodiment of a clamp-squeezing apparatus made in accordance with this invention.

FIG. 3 illustrates the various elements of the clamp-closing or squeezing apparatus of this invention adapted to be utilized in conjunction with the known terminating and testing apparatus illustrated in FIG. 1 for automatically closing the clamp 47. In FIG. 3, the numeral 34 identifies a mounting plate adapted to be supportably mounted on a slide assembly shown in FIGS. 13 and 14 and which is slidably movable over a supporting way or track 53 mounted on stationary support 59. The slide assembly comprises a slide plate 35 and side guides 73 secured to slide plate 35 by screws 39, and effects sliding and bearing engagement with way or track 53 with the assistance of roller bearings 41 schematically illustrated in FIG. 14. Mounted on plate 34 are spaced pins 36 (FIG. 3) on which are pivotally mounted opposed squeeze arms 38R and 38L. The elements of arm 38R in FIG. 3 are illustrated in exploded relation whereas the comparable elements of the squeeze arm 38L are illustrated in assembled condition. Each mounting pin 36 is received within a bushing 40 housed within aperture 42 of the respective squeeze arm. Each bushing 40 engages friction-reducing washers 44 at opposed ends.

Each squeeze arm also includes a spring lever 46 secured by screws 48 or the like in receiving apertures 50. At the end opposite to the attachment to the squeeze arm, each spring lever engages a jaw holder 52 by means of screw 51. Secured to each jaw holder 52 is a jaw 54 having apertures 56 through which securing means 58 pass in the course of engaging threaded openings 60 in the jaw holder 52. Adjustment screw 62 which traverses threaded opening 64 in one end of its respective squeeze arm is adapted to serve as an adjustable stop for the spring arm 46 on which the jaw holder 52 and jaw 54 are mounted. For cables of small diameter affording relatively small resistance to the clamp 47, the jaws 54 are able to effect a desired clamp-squeezing action without flexing of the heavy spring levers 46. For cables of larger diameter affording greater resistance to the clamp 47 in the course of squeezing by the jaws 54, the ends of screws 62 function as positive stops for flexing of the spring levers 46. Thus a desired clamping action by the jaws 54 is assured even when significant resistance is afforded by large diameter cables disposed on the clamp 47. The screws 62 thus permit a flexibility in apparatus operation whereby cables of varying diameter are securely engaged by a connector clamp.

Figure 11:
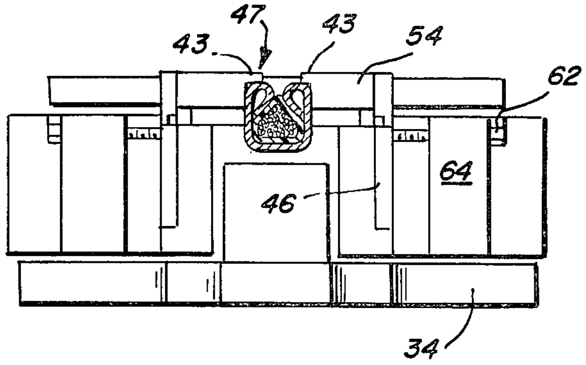
FIG. 11 is a view similar to FIG. 10 illustrating the provided clamp-squeezing apparatus and clamp of FIG. 6 following completion of its clamp-squeezing movement.

It will be seen from FIGS. 3, 10 and 11 that each jaw 54 has an upper projecting lip 43 extending from a main body portion and adapted to define a cable-clamp receiving recess with such contiguous body portion. Such recesses thereby controllably receive opposed curved portions 'C' of the cable clamp 47, see FIG. 10. The right-angle juncture between the lip 43 and main body portion of each jaw retentively engages each clamp 47 as it is squeezed from the divergent-wall position of FIG. 10 to the cable-clamping position of FIGS. 11 and 12.

FIG. 11 also illustrates the manner whereby the end of one adjusting screw 62 engages the spring arm 46 on which the jaw holder 52 and jaw 54 are mounted for the desired, precise maximum closed dimension of clamp 47 for cables of large diameter.

Disposed on the end portion of each squeeze arm oppositely disposed to the jaw 54 is a roller-like cam follower 70 mounted on bolts 72 (FIG. 3) which traverses an aperture in the squeeze arm prior to threadably engaging nut 74. As seen from FIG. 3, as each squeeze arm pivots about its pin 36 the opposed arm ends on which the jaw 54 and roller 70 are mounted will move in the opposite directions.

Figure 9:
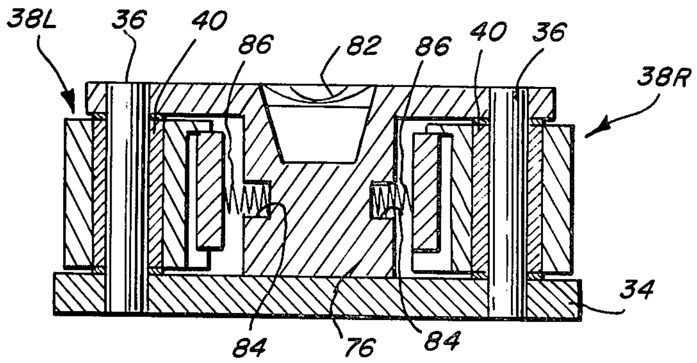
FIG. 9 is a sectional view taken on line 9—9 of FIG. 8.

Also mounted on the pins 36 of the carriage plate 34 and in overlying relation with the squeeze arms 38R and 38L is a riser plate 76 having spaced apertures 78 through which the mounting pins 36 pass. Riser plate has a central depression 82 in which a cable adapted to be clamped in place by means of the clamp squeezing assembly illustrated in FIG. 3 may rest and rise gradually from the connector to which attached. Riser plate 76 also has transverse openings 84 adapted to house springs 86. Springs 86 maintain a constant bias against the spring levers or arms 46 attached to the squeeze arms 38R and 38L. The engagement between the springs 86 and the spring arms of each squeeze arm is most clearly seen in the sectional view of FIG. 9. Such a spring-spring-arm engagement assures biased positioned whereby each squeeze arm is prevented from movement about its mounting pin 36 other than that caused by its respective roller cam 70. Riser plate 76 and the plate 34 with squeeze arms 38R and 38L mounted thereon are reciprocally movable along way 53 while supported on slide plate 35, illustrated in FIG. 13.

A cam plate 92 is fixed in position by means of screws 94 or the like which traverse apertures 96 in the cam plate 92 prior to engaging receiving apertures in opposed rail-like portions 98 of an integral frame-like casting 100. Casting 100 forms a portion of a stationary supporting structure with supporting substrate 59 of FIGS. 13–14. Each squeeze arm roller 70 comprises a cam follower and is adapted to travel a cam-defined path in the course of reciprocal movement of the plate 34 on which mounted. Such paths are defined by cam tracks 90R and 90L in the underside of plate 92, see FIG. 4. Cam track 90R receives the cam follower 70 of squeeze arm 38R, and cam track 90L receives the cam follower 70 of squeeze arm 38L (FIG. 4). Sealing angle 101 shown in FIG. 3 and fragmentarily illustrated in FIG. 4 prevents dirt from entering the tracks of cam plate 92 through opening 103 between the casting 100 and plate 92 illustrated in FIG. 4.

The cam plate 92 remains in fixed position during reciprocal axial movement of slide plate 35, plate 34 and the squeeze arm elements mounted thereon. An upper clamp-mounting plate 102 on which the clamp housing 27 and actuating handle 22 are mounted, see FIGS. 2 and 3, also is movable with the carriage plate 34 by means of its connection to such plate through intermediate connecting plate 104 of FIG. 3. Mounting plate 102 has apertures 116 therethrough for purposes of mounting the housing 27 thereon. Plate 104 is apertured at 106 for reception of screws or the like which also traverse openings 107 of the riser plate and of the mounting plate 102. Connecting plate 104 also is secured to the upper mounting plate 102 by means of securing means such as screws 108 or the like which traverse apertures 110 of the mounting plate 102 as well as apertures 112 of the connecting plate 104. The mounting plate 102 is movable in closely-spaced relation over the opposed rail-like portions 98 of the upper stationary casting 100 by means of opposed lateral flange portions 114. Casting 100 is a fixed portion of the housing 12.

As seen from FIG. 3, assembled with each cam plate 92 are two cam switches 120R and 120L. Each of these switches is pivoted on a pin 130. Mounted in a slot 122 of each cam switch (FIGS. 5–6) is a spring 124. A locking plate 132 secures each cam switch 120R and 120L and its associated spring 124 in desired relation with its appropriate cam track 90L or 90R. Each spring 124 is nestably received in a recess 125, one of which is seen in FIG. 4, having one closed end and one open end terminating in an adjacent central cam track portion as seen in FIG. 4. As a result, each switch 120R and 120L is biased into engagement with a central raised rib 127 of the cam plate.

FIGS. 4 through 6 illustrate cam switch 120L, the switch 120L being retained in position on its pin 130 by locking plate 132 secured to the cam plate 92 by means of securing means such as the illustrated screws 134. The springs 124 disposed in the slots 122 of each cam switch 120R and 120L are adapted to bias each cam switch for rotational movement about its mounting pin 130 in the direction of the central plate rib 127. Thus in FIG. 4 cam switch 120L is biased for counter-clockwise rotation about its pin 130, and cam switch 120R when mounted in the illustrated plate 92 is biased by its associated spring 124 in a clockwise direction of rotation.

It is the function of the cam switch 120L to direct the cam follower roller 70 of squeeze arm 38L to follow the circuitous track path illustrated in FIG. 6 as the assembly 30 is reciprocated. That is, the path in which the cam follower 70 of arm 38L first proceeds, when the assembly 30 is advanced, is that portion of the track 90L adjacent the outer edge of the cam plate 92 in the direction of arrow "S." In the course of such passage, the squeeze arm ends on which squeeze jaws 54 are mounted will approach each other into the position of FIG. 11 to effect a squeezing engagement on an interposed cable clamp such as the illustrated cable clamp 47.

As above described, spring 86 in riser plate 76 urges cam roller 70 of squeeze arm 38R couterclockwise and cam roller 70 of squeeze arm 38L in a clockwise direction of rotation. The switches 120 thus guide the rollers in their desired track paths. The cam switches 120R and 120L prevent the cam followers 70 from initially proceeding during the squeezing operation along the track portions disposed adjacent the central longitudinal axis of the cam plate 92 in which position the cam followers would force the opposed jaws of the squeeze arms to remain in spaced-apart relationship whereby no squeezing action on an interposed clamp member would be effected. The switch springs 124 readily allow the switches to pivot as seen in FIG. 6 to permit passage of rollers 70 along the centrally disposed track portions of the cam plate 92 when the squeeze jaws are being returned and the rollers are moving in the direction of the arrow "R."

Figure 7:
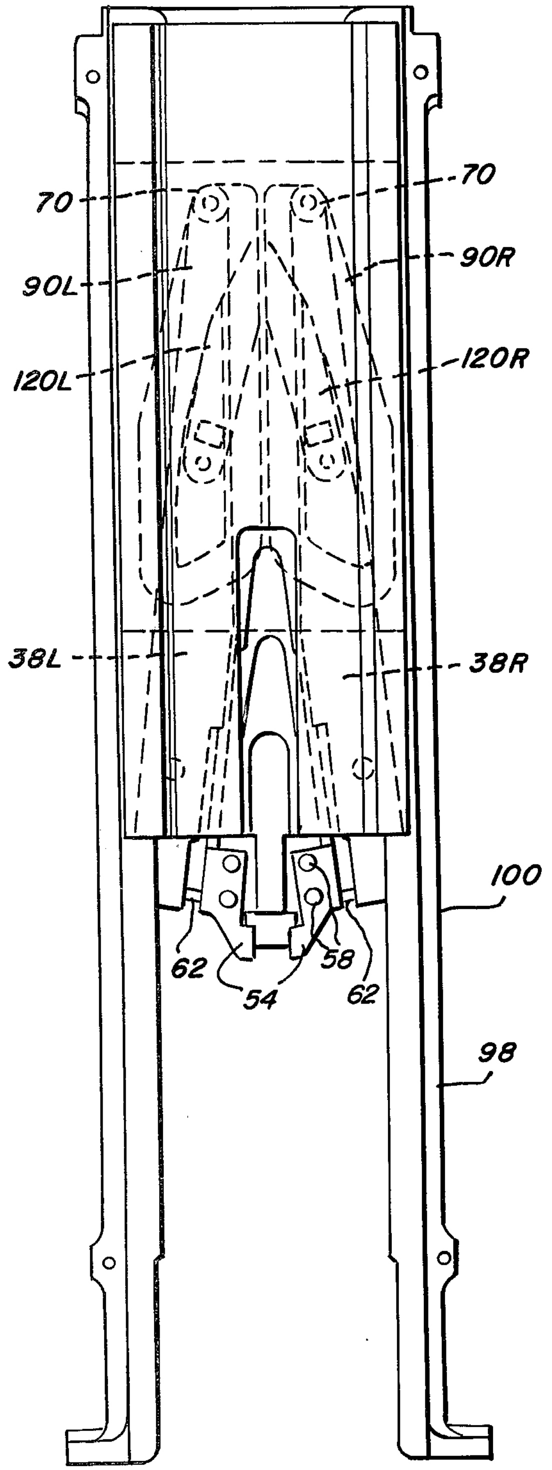
FIG. 7 is a top plan view of the clamp-squeezing elements of FIG. 3 in assembled position in its initial connector-receiving position.
Figure 8:
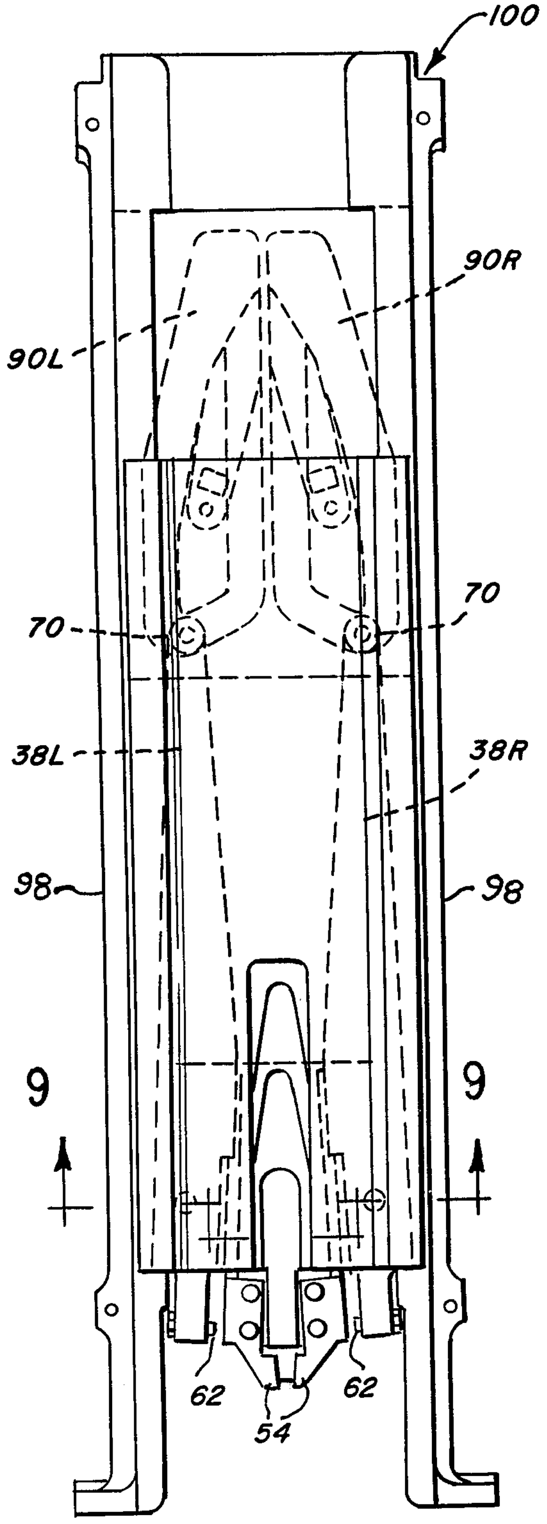
FIG. 8 is a view similar to FIG. 7 illustrating a clamp-squeezing apparatus of this invention at the completion of its clamp-squeezing action.

A comparison of the squeeze jaw locations in the plan views of FIGS. 7 and 8 illustrates the extent of the axial and lateral movement of the squeeze jaws during operation of the provided clamp squeezing apparatus. In the course of effecting such movement, a clamping engagement results between the cable clamp 47 illustrated in FIGS. 10 through 12, and a cable member 142 disposed therein. FIG. 7 illustrates cam followers 70 at their starting positions within the cam tracks 90L and 90R of cam plate 92. FIG. 8 illustrates cam followers 70 at their maximum displacement from the original starting points.

As seen in FIG. 7, cam switch 120R is positioned by its associated spring 124 so as to rotate about its pin 130 whereby it is in its furthermost counterclockwise position. Similarly cam switch 120L is urged by its associated spring 124 to be rotated about its mounting pin 130 so as to be disposed in its furthermost clockwise position of rotation. As an axial pull is imparted to the handle 22 in the vertical position of FIG. 1, the cam followers 70 proceed along a portion of the cam tracks 90R and 90L disposed adjacent the outer edges of the cam plate 92. Simultaneously, with this movement which is guided by the cam switches 120R and 120L, the cam followers 70 of the squeeze arms force the squeeze arms to pivot about their mounting pins 36 disposed on the plate 34 whereby the jaws 54 of the squeeze arms proceed toward each other so as to effect a gradual and powerful squeezing action on the opposed side walls of cable clamp 47. The clamp 47 thus automatically proceeds from the spread-apart position of FIG. 10 into clamping engagement with the interposed cable 140 illustrated in FIGS. 11 and 12 as the assembly 30 is advanced from the retracted connector loading position to the forward termination position.

Previously it was necessary for the operator employing the illustrated terminating apparatus 10 and 12 of FIG. 1 to effect a separate clamping action on the cable clamp 140 by means of a tool such as a pliers or the like. Such step is no longer necessary. The apparatus provided herein enables such clamping action to automatically take place thereby dispensing with any operator attention or time, and contributing to the overall efficiency of the conductor-terminating steps of the operator.

As noted from FIGS. 4 and 6, after each squeeze arm cam follower 70 has proceeded along its respective outer track portion disposed adjacent the edge of the cam plate 92 the maximum distance from its initial starting point, the mounted connector illustrated in FIG. 13 will be in its desired location for effecting the various semiautomatic terminations of the conductors extending from the clamped cable 142. Following the completion of the desired terminations, the clamp handle 22 may be pivotally moved into its initial position of FIG. 2 and the terminated connector removed from the apparatus.

As termination of each connector is completed, that connector may be plugged into the test apparatus 14. With both connectors of a cable assembly attached, the test device is cycled to complete the requisite tests, e.g., continuity, open circuit, and correct wire placement. Thereupon a completed and tested assembly has been finished by a single related series of manipulations by the responsible operator in one position.

The movable carriage and clamp assembly may be readily axially returned by the handle 22 to its initial position of use illustrated in FIG. 2. The cam followers 70 are biased during such return into engagement with side walls of their tracks in which they are disposed in rattle-free engagement by virtue of the biasing springs 86, see FIGS. 3 and 9, and proceed during the reverse movement of the squeezing apparatus assembly along the portions of the tracks disposed adjacent the central rib 127 of the cam plate 92 in the manner illustrated in FIG. 6. Thus, in the course of reverse movement of the clamp squeezing assembly, cam followers 70 will force the clamping jaws 54 of the squeeze arms 38R and 38L to move away from each other so as to arrive at the initial position of use illustrated in FIGS. 7 and 10, in position for receipt of the next connector.

It is believed apparent from the foregoing that a number of modifications may be made to the apparatus above described which will remain within the ambit of the invention disclosed. The apparatus may be mechanized as by employing a drive motor actuated by a pushbutton to move the squeeze arm assembly in either axial direction rather than employing the manual driving force of the testing operator. It is further evident that various forms of cam followers and cam tracks may be substituted for those illustrated which will provide similar results in the squeezing of the cable clamp as the same is brought into its desired position whereat wire or conductor terminations are effected by means of the terminating apparatus. This invention is to be limited, therefore, only by the scope of the appended claims.

What is claimed is:

1. A clamp squeezing apparatus comprising a stationary support, a support plate mounted on said stationary support for reciprocal movement along a path of travel; a nest mounted on said support plate for positioning an electrical connector having a cable clamp disposed thereon; squeeze arms pivotally mounted on said movable plate; squeeze jaws connected to said squeeze arms located so as to be disposed on either side of a connector clamp when such connecter is mounted on said nest; means carried by said plate for moving said plate along an axial path, and stationary cam means on said stationary support and connected to said squeeze arms for urging said squeeze arm jaws into clamping engagement with a connector cable clamp mounted on said nest in the course of support plate movement.

2. The clamp squeezing apparatus of claim 1 in which said cam means comprises cam tracks disposed adjacent the path of movement of said support plate and said squeeze arms have cam followers mounted thereon; said cam tracks urging said squeeze arms to pivot in such a manner that such clamping jaws approach either other in one direction of carriage means movement and withdraw from each other in the opposite direction of carriage movement.

3. The apparatus of claim 1 in which switches are mounted on said cam means for directing the movement of said squeeze arms relative thereto.

4. The apparatus of claim 3 in which said cam switches are pivotally mounted and have associated therewith resilient means biasing said switch means in a desired direction of rotation whereby said cam follower means are urged to proceed along a predetermined path defined by said cam tracks.

5. Apparatus for simultaneously clamping a conductor-carrying cable to a cable clamp mounted on an electrical connector while moving such cable-clamp-connector combination to a connector terminating station, comprising a stationary support; a reciprocally movable carriage on said stationary support having means for supportably receiving in fixed position an electrical connector having a cable clamp mounted thereon; opposed squeeze arms mounted on said carriage for squeezing opposed clamp portions of such cable clamp mounted thereon; said opposed squeeze arms being pivotally movable toward and away from each other; said squeeze arms approaching each other in a closing action in the course of carriage movement toward such terminating station and opening in the course of carriage movement away from such terminating station; stationary cam means on said stationary support and disposed adjacent the path of said carriage movement engaging said squeeze arms for imparting closing and opening action to said squeeze arms in the course of carriage movement.

6. The apparatus of claim 5 in which said opposed squeeze arms comprise pivotally mounted arms having cam followers disposed on the ends thereof and said stationary cam means comprise tracks in which said cam followers are guided in the course of said carriage reciprocal movement.

7. The apparatus of claim 6 in which said cam followers of said squeeze arms traverse different portions of said cam means tracks in the course of said carriage reciprocal movement, and pivotally mounted switch means are mounted in said cam means for directing said cam followers into a desired track portion in the course of such movement.

8. The apparatus of claim 5 in which a manually actuatable clamp means is connected to said carriage for releasably clamping a cable in an open cable clamp disposed on said carriage; said clamp having a handle portion for manual engagement thereof and for reciprocal movement of said carriage.

9. The combination of claim 5 in which each of said squeeze arms has a squeeze jaw mounted on a spring arm secured thereto, and stop means mounted in each of said squeeze arms for laterally limiting its associated squeeze jaw and spring arm to which secured relative to the squeeze arm on which mounted.

10. The combination of claim 6 in which said cam means comprises circuitous tracks in which each of said squeeze arm cam followers is disposed; track portions forcing said squeeze arms together in one direction of carriage movement and forcing said squeeze arms apart in a direction of movement opposite to said one direction; resiliently biased switch means mounted on said cam means for guiding the movement of said squeeze arm cam followers in said tracks.

11. The combination of claim 5 in which said squeeze arms are pivotally mounted on said carriage and resilient means mounted on said carriage engage and bias said squeeze arms in opposite directions of rotation about pivot means on which said squeeze arms are mounted.

12. Apparatus for simultaneously clamping a conductor-carrying cable to a cable clamp mounted on an electrical connector while removing such cable-clamp-connector combination to a conductor terminating station, comprising stationary support means; carriage means reciprocally movable on said stationary support means; nest means mounted on said carriage means for receiving an electrical connector which has a cable clamp mounted thereon; clamp means for clamping a cable to such cable clamp; guide means on said support means for supporting said carriage means in the course of said reciprocal movement; opposed squeeze arms for squeezing opposed portions of a connector cable clamp mounted on said movable carriage means; said squeeze arms being adapted to pivotally move toward and away from each other; rail means comprising a part of said stationary support means; said rail means being spaced from said carriage means and arranged substantially parallel to the axis of movement thereof, cam means secured to said stationary rail means; cam follower means disposed on each of said squeeze arms engaging said cam means for imparting pivotal movement to said squeeze arms in the course of carriage means reciprocal movement; a mounting plate supported by said carriage means for supportably mounting said cable clamp means; said mounting plate and carriage means being disposed on opposed sides of said rail means whereby said rail means is located therebetween.

13. The combination of claim 12 in which each of said squeeze arms has a spring arm resiliently mounted thereon; a squeeze jaw mounted on an end portion of said spring arm movable relative to the squeeze arm on which mounted; resilient means interposed said spring arm portion on which said squeeze jaw is mounted and said squeeze arm, and stop means mounted in each of said squeeze arms for laterally limiting movement of the associated squeeze jaw and spring arm.

* * * * *

UNITED STATES PATENT AND TRADEMARK OFFICE

CERTIFICATE OF CORRECTION

PATENT NO. : 4,193,187

DATED : March 18, 1980

INVENTOR(S) : Jacob S. Haller, Gordon L. Mines, Meinert J. Mischnic

It is certified that error appears in the above-identified patent and that said Letters Patent are hereby corrected as shown below:

Column 3, last line, delete "surface" (first occurrence)

Column 5, line 45, delete "spring-" (first occurrence)

Column 4, line 24, change "34" to -- W --

Column 9, line 10, change "connector" , second occurrence, to -- conductor --.

Column 9, line 16, change "clamp" to -- clamping --

Signed and Sealed this

*Ninth* Day of *December 1980*

[SEAL]

*Attest:*

SIDNEY A. DIAMOND

*Attesting Officer* *Commissioner of Patents and Trademarks*